(12) United States Patent
Kondalam et al.

(10) Patent No.: US 11,799,767 B2
(45) Date of Patent: Oct. 24, 2023

(54) DETECTING AND COMMUNICATING WITH SILENT HOSTS IN SOFTWARE-DEFINED NETWORKS

(71) Applicant: Cisco Technology, Inc., San Jose, CA (US)

(72) Inventors: Satish Kondalam, Milpitas, CA (US); Sanjay Kumar Hooda, Pleasanton, CA (US); Prakash C. Jain, Fremont, CA (US); Vikram Vikas Pendharkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/684,376

(22) Filed: Mar. 1, 2022

(65) Prior Publication Data

US 2022/0191135 A1 Jun. 16, 2022

Related U.S. Application Data

(63) Continuation of application No. 16/864,402, filed on May 1, 2020, now Pat. No. 11,316,782.

(51) Int. Cl.
*H04L 45/00* (2022.01)
*H04L 12/18* (2006.01)
*H04L 45/02* (2022.01)

(52) U.S. Cl.
CPC .............. *H04L 45/32* (2013.01); *H04L 12/18* (2013.01); *H04L 45/02* (2013.01)

(58) Field of Classification Search
CPC ......... H04L 45/32; H04L 12/18; H04L 45/02; H04L 45/64; H04L 45/38; H04L 45/42
See application file for complete search history.

(56) References Cited

U.S. PATENT DOCUMENTS

| | | | |
|---|---|---|---|
| 9,665,513 B2 | 5/2017 | Levy | |
| 10,320,619 B2 | 6/2019 | Seddigh et al. | |
| 10,673,736 B2 | 6/2020 | Srinivasan et al. | |
| 10,735,276 B2 * | 8/2020 | Torigoe | H04L 45/38 |

(Continued)

OTHER PUBLICATIONS

International Search Report and Written Opinion from the International Searching Authority, dated Jul. 9, 2021, 11 pages, for corresponding International Patent Application No. PCT/US2021/028782.

*Primary Examiner* — Chandrahas B Patel
(74) *Attorney, Agent, or Firm* — Polsinelli (57) ABSTRACT

Systems, methods, and computer-readable media for discovering silent hosts in a software-defined network and directing traffic to the silent hosts in a scalable and targeted manner include determining interfaces of a fabric device that are connected to respective one or more endpoints, where the fabric device is configured to connect the endpoints to a network fabric of the software-defined network. At least a first interface is identified, where an address of a first endpoint connected to the first interface is not available at the fabric device. A first notification is transmitted to a control plane of the software-defined network based on identifying the first interface, where the control plane may create a flood list which includes the fabric device. Traffic intended for the first endpoint from the network fabric is received by the fabric device can be based on the flood list.

18 Claims, 7 Drawing Sheets

(56) References Cited

U.S. PATENT DOCUMENTS

| | | | |
|---|---|---|---|
| 10,873,523 B2* | 12/2020 | Larson | H04L 45/02 |
| 11,025,536 B1 | 6/2021 | Venkatarannanan et al. | |
| 2016/0352579 A1 | 12/2016 | He et al. | |
| 2018/0309685 A1 | 10/2018 | Srinivasan et al. | |
| 2021/0091977 A1 | 3/2021 | Takeda et al. | |
| 2021/0144083 A1* | 5/2021 | Dubey | H04L 45/22 |

* cited by examiner

DETECTING AND COMMUNICATING WITH SILENT HOSTS IN SOFTWARE-DEFINED NETWORKS

CROSS-REFERENCE TO RELATED APPLICATION

This application is a continuation of U.S. Non-Provisional patent application Ser. No. 16/864,402, filed May 1, 2020, the content of which is hereby expressly incorporated by reference in its entirety.

TECHNICAL FIELD

The subject matter of this disclosure relates in general to the field of computer networking, and more particularly to efficiently discovering and communicating with silent hosts in software-defined networks.

BACKGROUND

The enterprise network landscape is continuously evolving. There is a greater demand for mobile and Internet of Things (IoT) device traffic, Software as a Service (SaaS) applications, and cloud adoption. In recent years, software-defined enterprise network solutions have been developed to address the needs of enterprise networks. Software-defined enterprise networking is part of a broader technology of software-defined networking (SDN) that includes both software-defined wide area networks (SDWAN) and software-defined local area networks (SDLAN). SDN is a centralized approach to network management which can abstract away the underlying network infrastructure from its applications. This de-coupling of data plane forwarding and control plane can allow a network operator to centralize the intelligence of the network and provide for more network automation, operations simplification, and centralized provisioning, monitoring, and troubleshooting.

In some enterprise networks, there may be some endpoints which remain silent and difficult to discover. For example, badge readers, building management systems, some IoT devices, printers, etc., may be in a sleep mode or silent without actively sending traffic on the network fabric until they are woken up. In some cases the silent hosts may connect to the enterprise fabric through local area networks (LANs) or other layer 2 networks, where they may traditionally be implemented as wake-on-LAN devices.

For example, within the LAN, the silent hosts may be woken up by directing traffic to the silent host intended to wake up the silent host and cause the silent host to respond. However, some silent hosts, by virtue of remaining silent may not have registered their source address, which makes directing traffic to the silent hosts a challenge. Conventionally, this challenge may be addressed by broadcasting packets intended for the silent host across the entire network, with the intent that the traffic will reach the silent host wherever the silent host may be located. Broadcasting packets across the entire network is also referred to as flooding. When the silent host receives the intended traffic based on the flooding, the silent host may wake up and respond as appropriate.

However, flooding the network in this manner is not a scalable or feasible approach to reach a silent host over a software defined network. For example, when a source device wishes to reach the silent host across an SDN, the source device may direct traffic intended for the silent host to a fabric device (e.g., an edge/border router) that the source device is connected to. The fabric device may obtain a map for routing traffic from a control plane implemented in the SDN traffic based on the intended destination for the traffic. In the case of a silent host, a registration may not be available for the silent host's location, and so the control plane will not be capable of supplying the route for directing traffic to a silent host. The of devices directly and indirectly connected to the enterprise fabric on an SDN are potentially of orders of magnitude higher than the number of devices which may be connected on a traditional layer 2 LAN. Thus, attempting to detect a silent host using the same approach as described within a LAN (e.g., blindly flooding the entire enterprise fabric) is not a feasible option.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for efficiently discovering silent hosts in a software-defined network and directing traffic to the silent hosts in a scalable and targeted manner which avoids the aforementioned drawbacks of blind flooding. Some examples herein are directed to dynamically determining fabric devices which can include silent hosts behind them. A control plane can maintain an identification of these fabric devices and assisting in directing traffic intended for silent hosts to these fabric devices, without flooding the entire network with the traffic.

In some examples, a method is provided. The method comprises determining one or more interfaces of a fabric device that are connected to respective one or more endpoints, wherein the fabric device is configured to connect the one or more endpoints to a network fabric of a software-defined network; identifying at least a first interface of the one or more interfaces, wherein an address of a first endpoint connected to the first interface is not available at the fabric device; transmitting a first notification to a control plane of the software-defined network based on identifying the first interface; and receiving traffic intended for the first endpoint from the network fabric based on transmitting the first notification.

In some examples, a system, is provided, the system comprising one or more processors; and a non-transitory computer-readable storage medium containing instructions which, when executed on the one or more processors, cause the one or more processors to perform operations including: determining one or more interfaces of a fabric device that are connected to respective one or more endpoints, wherein the fabric device is configured to connect the one or more endpoints to a network fabric of a software-defined network; identifying at least a first interface of the one or more interfaces, wherein an address of a first endpoint connected to the first interface is not available at the fabric device; transmitting a first notification to a control plane of the software-defined network based on identifying the first interface; and receiving traffic intended for the first endpoint from the network fabric based on transmitting the first notification.

In some examples, a non-transitory machine-readable storage medium is provided, including instructions configured to cause a data processing apparatus to perform operations including: determining one or more interfaces of a fabric device that are connected to respective one or more endpoints, wherein the fabric device is configured to connect the one or more endpoints to a network fabric of a software-defined network; identifying at least a first interface of the one or more interfaces, wherein an address of a first endpoint connected to the first interface is not available at the fabric device; transmitting a first notification to a control plane of the software-defined network based on identifying the first interface; and receiving traffic intended for the first endpoint from the network fabric based on transmitting the first notification.

In some examples, the first endpoint comprises a silent host, the address of the first endpoint being unavailable at the fabric device based on a lack of traffic flow from the silent host.

Some examples further comprise: receiving an indication of a second endpoint comprising a silent host from a network device, the network device connecting the second endpoint to the fabric device; transmitting a second notification to the control plane based on the indication of the second endpoint comprising the silent host; and receiving traffic intended for the second endpoint from the network fabric based on transmitting the second notification.

In some examples, wherein receiving traffic intended for the first endpoint from the network fabric based on transmitting the first notification comprises receiving traffic multicast to fabric devices on a flood list, the flood list based on at least the first notification.

In some examples, receiving traffic intended for the first endpoint from the network fabric based on transmitting the first notification comprises receiving traffic multicast to fabric devices included in a multicast group, the fabric device subscribed to the multicast group based on at least the first notification.

In some examples, identifying at least the first interface of the one or more interfaces is based on a device tracking operation for identifying addresses of the one or more endpoints connected to the one or more interfaces.

In some examples, the first endpoint is connected to the first interface through a local network.

DESCRIPTION OF EXAMPLE EMBODIMENTS

Figure 1:
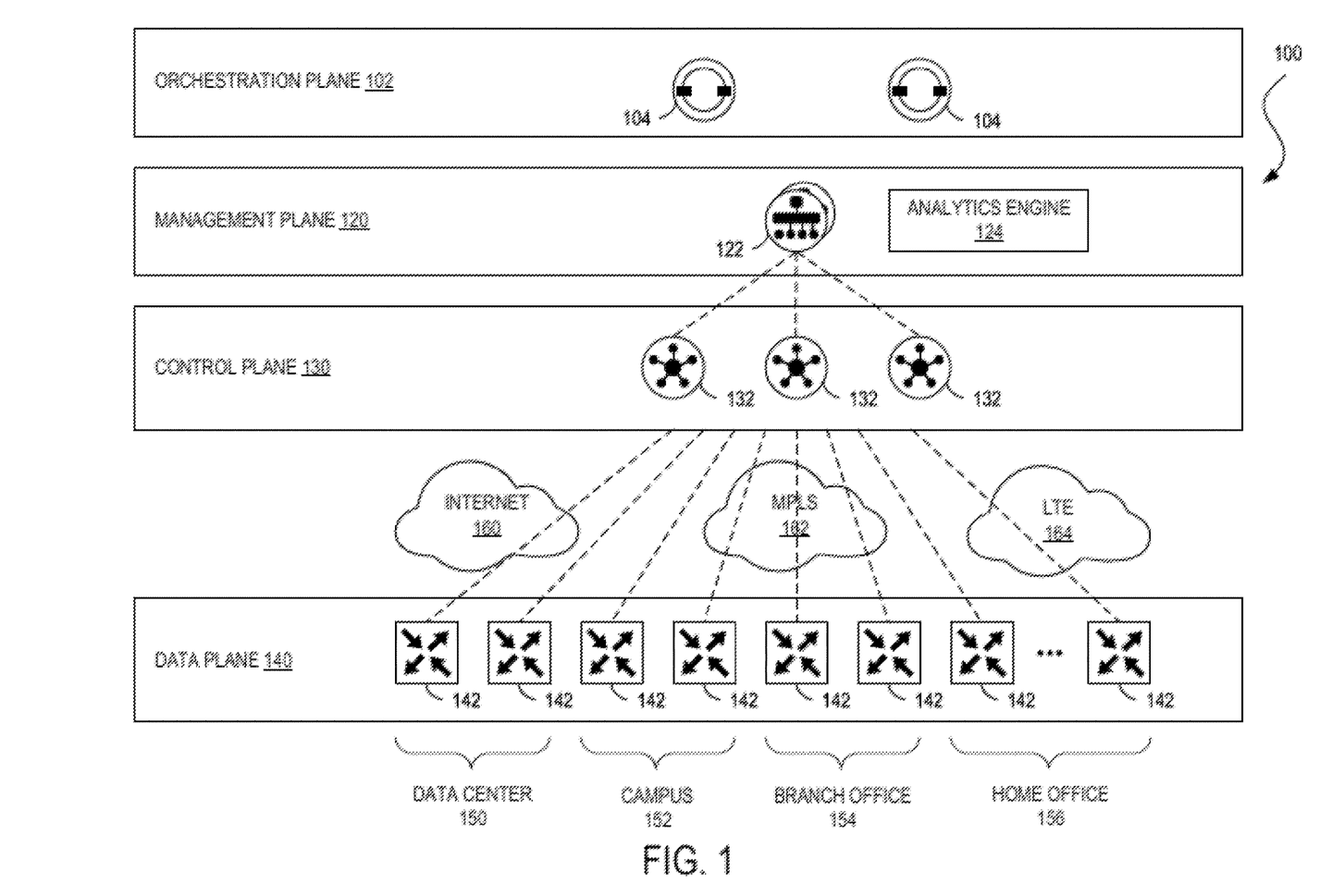
FIG. 1 illustrates a high-level network architecture, in accordance with some examples.

FIG. 1 illustrates an example of a network architecture 100 for implementing aspects of the present technology. An example of an implementation of the network architecture 100 is the Cisco® Software Defined Wide Area Network (SD-WAN) architecture. In some examples, the network architecture 100 can correspond to an enterprise network. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other examples may include different numbers and/or types of elements but one of ordinary skill the art will appreciate that such variations do not depart from the scope of the present disclosure.

In the illustrated example, the network architecture 100 includes an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some aspects, the network orchestrator appliance(s) 104 can also enable communication of devices located behind Network Address Translation (NAT). In some aspects, physical or virtual Cisco® SD-WAN vBond appliances can operate as the network orchestrator appliance(s) 104.

The management plane 120 can be responsible for central configuration and monitoring of the network architecture 100. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some examples, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some examples, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
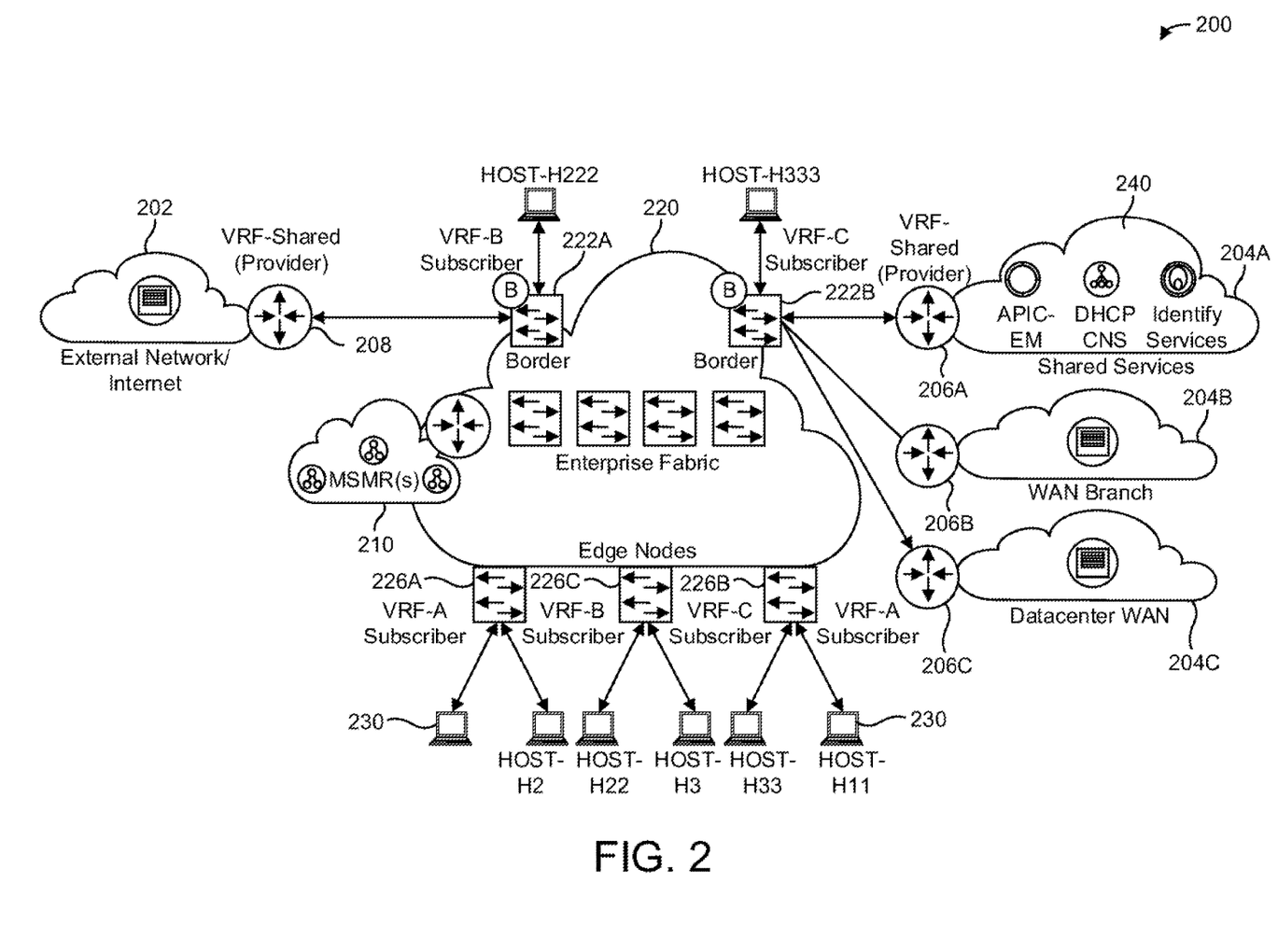
FIG. 2 illustrates a network fabric configured in accordance with some examples.

FIG. 2 illustrates an example of a network 200 configured for a LISP deployment environment. In some examples, the network 200 can be implemented using the network architecture 100. As previously mentioned, Locator ID Separation Protocol (LISP) provides improved routing scalability and facilitates flexible address assignment for various uses such as multi-homing, provider independence, mobility, and virtualization. LISP uses two separate IP addresses: one to indicate routing locators (RLOCs) for routing traffic through the global Internet and a second address for endpoint identifiers (EIDs) used to identify network sessions between devices. In some examples, the LISP EID namespace can represent customer end sites in a manner similar to how end sites are defined in non-LISP environments, with a notable difference in that the IP addresses used within these LISP sites are not advertised within the non-LISP Internet or RLOC namespace, e.g., belonging to the enterprise fabric 220. In some examples, end-customer LISP functionality can be deployed on customer endpoint routers which can include an egress tunnel router (ETR) and an ingress tunnel router (ITR). In some examples, an xTR can perform both the LISP functions of an ETR and an ITR.

FIG. 2 illustrates various sites, e.g., virtual route forwarding sites (VRFs), which can include providers such as an external network or internet 202, as well as shared VRFs such as the shared services 204A-C. The shared services can include hosts (e.g., hosts 240 in shared services 204A), for example. Border routers (e.g., xTRs) 222A and 222B can provide access to the shared services 204A-C using routers 206A-C respectively for routing traffic to the core or enterprise fabric 220. Similarly, router 208 can connect the external network or internet 202 to the enterprise fabric 220. Several edge devices 226A-C may include routers for providing access to end units or hosts 230. One or more map servers (or devices implementing a map server/map resolver function) such as an MSMR 210 can maintain and implement routing policies for the various routers (e.g., border devices 222A-B, edge devices 226A-B, or other customer premises equipment (CPE) routers).

The MSMR 210 can be configured to maintain and provide map or routing policies to the various requesting entities such as the ITRs discussed above. The LISP deployments are configured as pull-based mechanisms for obtaining the routing policies using the Map-Request messages, for example. Although not explicitly shown in FIG. 2, a control plane such as the control plane 130 of FIG. 1 can be configured to maintain network topology and direct traffic flow in the enterprise fabric 220.

As previously mentioned, one or more endpoints such as the host devices 230 can include silent hosts. For example, the silent hosts may be in a sleep mode to be woken up when traffic directed to them is received, or they may be responsive to specific types of multicast or broadcast messages. The silent hosts can include various types of devices such as network-connected printers, IoT devices, badge readers, near field communication (NFC) enabled equipment, etc., which may not need to be in a powered on mode continually sending/receiving traffic to/from the enterprise fabric 220. Rather, such silent hosts may conserve power by remaining in sleep mode or silent mode until they are woken up, and upon completion of traffic exchange corresponding to specific tasks, they may return to the sleep mode. As explained above, for the software defined network fabric, the traffic flow in the enterprise fabric 220 can be supported by overlay transport networks (e.g., L3 or Layer 3 traffic), while the underlay routing can include L2 tunnels, LANs, etc. Various endpoints can be present in local networks, which may connect to the enterprise fabric 220 through a router or edge device.

When the silent hosts are in sleep mode, they may not be detectable. For example, the silent hosts may be connected to the enterprise fabric 220 through an edge device or router, where the connection to the router may be through a local network, e.g., a layer 2 or LAN connection. In the case of traditional flooding techniques for detecting a silent host within the local network, a packet intended for the silent host may be replicated on all ports of a router or switch to which a source device is connected. Replicating the packet in this manner can effectively transmit the packet through all channels of the LAN, for example, with the intention of reaching the silent host over at least one of the channels. If the silent host receives the packet based on the LAN being flooded with the packet, the silent host may be woken up and can provide a response. The response would provide an indication where the response originated (e.g., the edge device behind which the silent host is located). Based on this information, once the silent host responds, the router connected to the source device can learn the port through which the packet reached the silent host and can direct subsequent traffic intended for the silent host through that port, without having to flood the LAN. In a LISP-based implementation, which is a pull-based mechanism, the router, having discovered the silent host may not necessarily supply this information to a control plane (or map server). Thus, unless the silent host communicates over the enterprise fabric 220 upon being woken up, a registration for the silent host may never be created in the control plane 130, for example. Therefore, the silent host without a registration may remain undetectable. As previously mentioned flooding the enterprise fabric 220 (e.g., implemented in layer 3 as a software-defined overlay network) is not feasible given the vast number of devices that can be connected to the enterprise fabric 220. Blindly broadcasting a packet to all edge devices of the enterprise fabric 220 can consume significant bandwidth and result in inefficiencies and resource wastage.

Accordingly, in example aspects of this disclosure, techniques for discovering silent hosts and directing traffic based on this discovery are provided. In some examples, silent hosts (e.g., which may have been connected to the enterprise network 220 through legacy networks such as LANs or may not have registered otherwise in an SDN) can be detected and traffic can be directed to these silent hosts based on this detection.

According to some examples, a silent host connected to a fabric device can be detected by the fabric device, whereupon the fabric device may convey this information upstream to a control plane or other fabric devices. For example, an edge device (e.g., router) connecting a silent host to the enterprise fabric 220 may have N ports. A device tracking process can be executed on the edge device for detecting the internet protocol (IP) or media access control (MAC) addresses of network devices connected to each of the N ports. Some ports (e.g., M ports of the N ports, where M is less than or equal to N) may be identified by the device tracking mechanism as being connected to a network device. These M ports are said to be in a "connected state" (e.g., an "UP" state of a switch corresponding to the port). However, the device tracking may not reveal the MAC address of the network devices connected to some of these M ports which are in the connected state. For example, even though one of the ports of the edge device may be in a connected state indicating that the port is connected to a network device, the network device's identification (e.g., MAC address) may be unavailable at the edge device. In example aspects, a network device whose MAC address is unavailable even though the edge device is determined to be connected to the network device is considered to be a potential candidate for being a silent host. In some examples, such a network device may alternatively be a device which only responds to a broadcast, and thus the network device's MAC address may not have been detectable without flooding the LAN by replicating a packet on all ports or the network device may only respond to a broadcast or multicast message.

Figure 3:
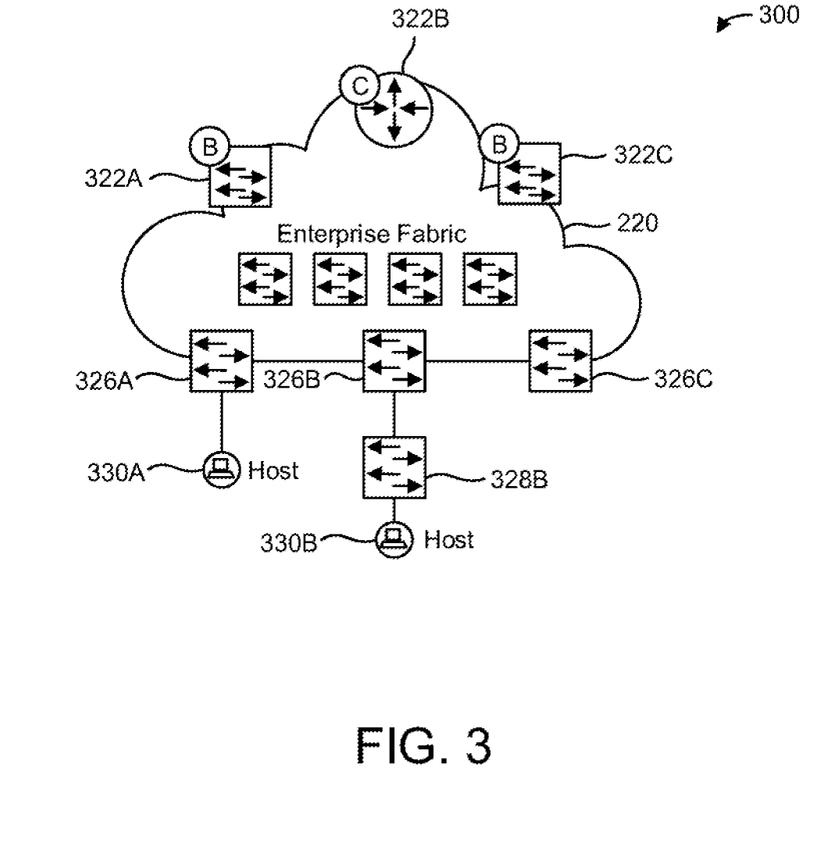
FIGS. 3-4 illustrate examples a network fabric configured for identifying and directing traffic to silent hosts, in accordance with some examples.

FIG. 3 illustrates a network 300 which may include aspects of the network 200 of FIG. 2. For example. FIG. 3 shows network devices which may be connected to the enterprise fabric 220 through fabric devices (e.g., using LISP based mechanisms). In an example, the fabric devices can include border devices (e.g., CPEs) such as routers 322A-C which may connect a respective set of endpoints or hosts to the enterprise fabric 220. The endpoints behind the routers 322A-C can belong to subscribers, providers, shared services, among others. Other fabric devices connected to the enterprise fabric can include edge devices such as routers 326A-C. In some examples, there may be one or more silent hosts behind one or more of the routers 326A-C. For example, host 330A may be a silent host behind the router 326A. A host 330B may be indirectly connected to the router 326B through network device 328B (e.g., a switch or router). In some examples, where the hosts 330A-B may be present in local networks, the hosts 330A-B may communicate with respective routers or switches over the local network (e.g., through a LAN connection). In the illustrative example, the router 326C is not shown to have a silent host behind it.

In example aspects, network device tracking mechanisms such as IP device tracking (IPDT) can be executed on the fabric devices of the network 300. For example, the routers 326A-C can execute IPDT or other protocols for tracking the IP or MAC addresses on each of their ports or interfaces to their local networks. For example, the IPDT or other protocol can be used to detect all the interfaces which are in a connected (e.g., "UP") state and to determine whether the MAC addresses are detected on each of the interfaces which indicate that they are connected. If any of these interfaces in the UT state do not have a MAC address detected, then those interfaces of the routers 326A-C which are in the UP state with no MAC address detected are identified as potential interfaces to which a silent host may be connected.

For example, the host 330A may be a silent host behind the router 326A. The router 326A may execute a device tracking protocol to identify all the network devices behind the router 326A. The router 326A may detect MAC addresses for network devices connected to all of its ports in the UP state except for a port which connects to the host 330A in an illustrative example. In such an example, this port of the router 326A in the UP state for which a MAC address is not available can be identified as a port to which a silent host may be connected. In an example, upon detection of a possible silent host, the router 326A may forward an indication of the possible silent host being behind the router 326A to the control plane 130.

In another example, the host 330E may be indirectly connected to the fabric device, router 326B, e.g., through the network device 328B in a local network. Detecting such an indirect silent host can involve additional processes because the host 330B may be hidden behind the network device 328B, but the MAC address of the network device 328B may be detectable through IPDT, potentially obscuring the presence of the silent host behind the network device 328B. For such examples, the device tracking can be extended to other nodes/switches behind the fabric devices, such as to the network device 328B.

For example, by extending the device tracking to be implemented by secondary nodes behind the fabric devices, the network device 328B can execute IPDT or other device tracking, which can reveal the existence of a possible silent host behind the network device 328B such as the silent host 330B, For example, the network device 328B may determine that the port of the network device 328B that the silent host is connected to is in the UP state but there is no MAC address detected for this port, leading the network device 328B to determine that the port may be possibly connected to a silent host. In such examples, the network device 328B can communicate to fabric devices e.g., edge nodes) such as the router 326B that there may be a silent host behind the network device 328B. The network device 328B can use a special packet field such as a True-Length-Value (TIN) field or other message types to include an indication of such a silent host being potentially present behind the network device 328B. This TLV or other indication can be received by the router 326B and forwarded to the control plane or to other fabric devices to indicate the possible presence of indirect silent hosts.

In some examples, the network device 328B can be configured to communicate the possible presence of the silent host upstream (e.g., to edge devices, border devices, etc.) using other techniques. For example, the network device 328B can form an Internet Group Management Protocol (IGMP) for a group of devices including the host 330B. Protocols such as the IGMP can be used to dynamically register individual hosts in a multicast group on a layer 2 network (e.g., a LAN through which the host 330B is connected to the network device 328B). The IGMP group originated by the network device 328B can be used to communicate to the router 326B, the possible presence of a silent host present in the IGMP group. In this manner, the network device 328B can signal an intent to receive traffic directed to silent hosts, where this intent can be forward upstream to the control plane or other fabric devices through the router 326B.

In various examples, once the silent host is detected at a fabric device (e.g., a border or edge device) the fabric device can register the information about the possible presence of a silent host behind the fabric device, at the control plane as noted above. In some examples, the control plane can create a flood list which includes all the fabric devices which have registered the possible presence of silent hosts with the control plane. For example, the fabric device can use a specially tailored registration message to the control plane which indicates to the control plane that there is a silent host behind the fabric device, or in some implementations, an indication to be registered in the flood list. The flood list can be maintained by the control plane 130 or another device such as the map server, for example.

When a fabric device with packets intended for a silent host requests a route or map from the control plane, the control plane may determine that the silent host is not registered at the control plane. Based on this determination, the control plane may forward the flood list to the requesting fabric device. The fabric device may multicast the packets to the fabric devices in the flood list, with the intent of the packets reaching the silent host which is possibly located behind one of the fabric devices on the flood list.

Figure 4:
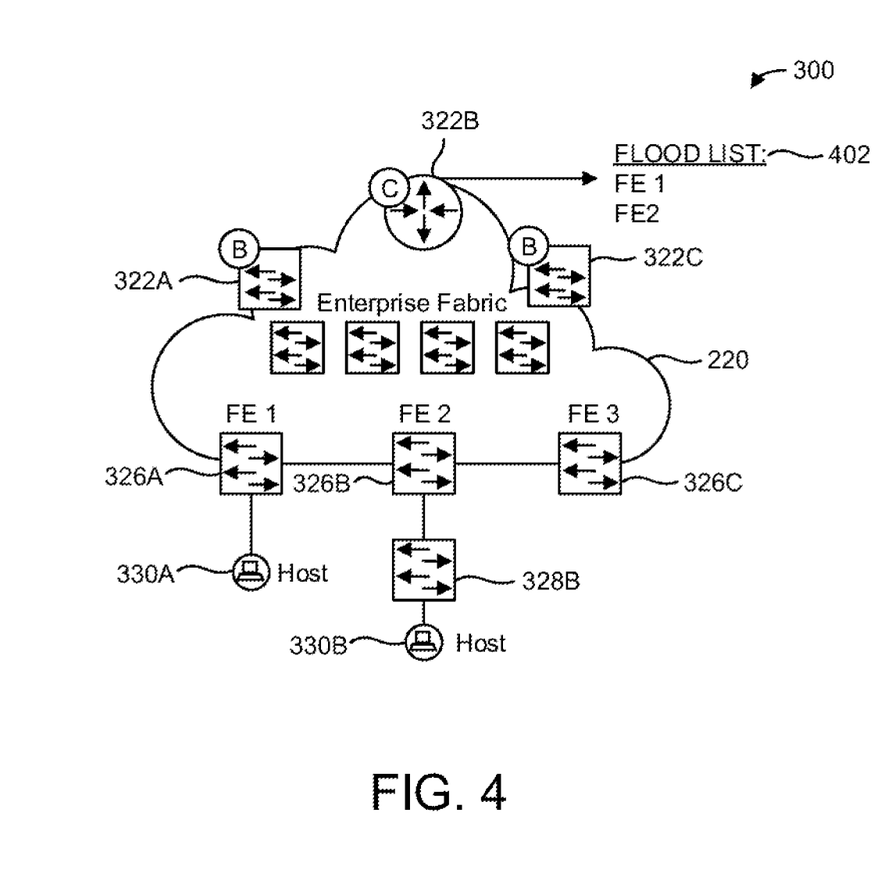

FIG. 4 illustrates examples of flood lists created in the network 300 of FIG. 3 using the above-described techniques. For example, the control plane 130 may have created a flood list 402 which includes at least the routers 326A-B which may have created registrations in the control plane as possibly having the silent hosts 330A-B behind them, as explained with reference to FIG. 3. The routers 326A-B are identified as fabric edge devices FE1 and FE2 respectively in FIG. 4.

In an example, a source device behind the router 322B may have a packet sent to the router 322B which is destined for one of the hosts 330A-B. The router 322B may forward a request to the control plane to obtain a destination address for the packet. The control plane 130 may determine that the destination address is not present among addresses registered by devices on the enterprise network 220 and forward the flood list 402 to the router 322B. Having obtained the flood list 402, the router 322B may then flood or multicast the packet to both of the fabric devices FE1 and FE2 on the flood list 402. The packet would then reach the routers 326A and 326B corresponding to FE1 and FE2, respectively. The multicast from the router 322B can indicate that the packet being sent may potentially be destined for a silent host behind these routers 326A and 326B. The routers 326A and 326B would then forward the packet through the respective ports on which the possible silent hosts were detected (either directly or indirectly, as discussed above). Accordingly, the selective unicast to the limited number of fabric devices on the flood list can significantly minimize the traffic involved in detecting and forward traffic to the silent hosts.

In another implementation, the fabric edge devices such as the routers 326A and 326B which have determined that a silent host possibly exists behind them may subscribe to a multicast group and notify the control plane 130 of the multicast group. In such implementations, when the control plane receives the request from the router 322B and discovers that the destination address is not present among addresses registered by devices on the enterprise network 220, the control plane 130 may send an indication of the multicast group to the router 322B. The router 322B may then provide the multicast of the packet to the multicast group.

The above description for silent hosts can also be applicable for clients which rely on broadcast flooding. For example, legacy devices which may only respond to broadcast flooding may be treated similarly as the silent hosts 330A-B discussed above. In some examples, such devices responsive to broadcast flooding can be detected based on the type of traffic that the devices may be sending. Classification engines such as Network-Based Application Recognition (NBAR) can be used to recognize and classify protocols and applications, where the classification engine may identify that the device is responsive to broadcast flooding. The fabric device (e.g., routers 326A-B) connected to the silent hosts can then transmit notifications upstream, e.g., to the control plane as having a client which belonging to a class of devices that are responsive to broadcast flooding. For such clients, the control plane may create a similar flood list or the fabric devices may subscribe to a multicast group, similar to the example implementations for silent hosts discussed above.

Figure 5:
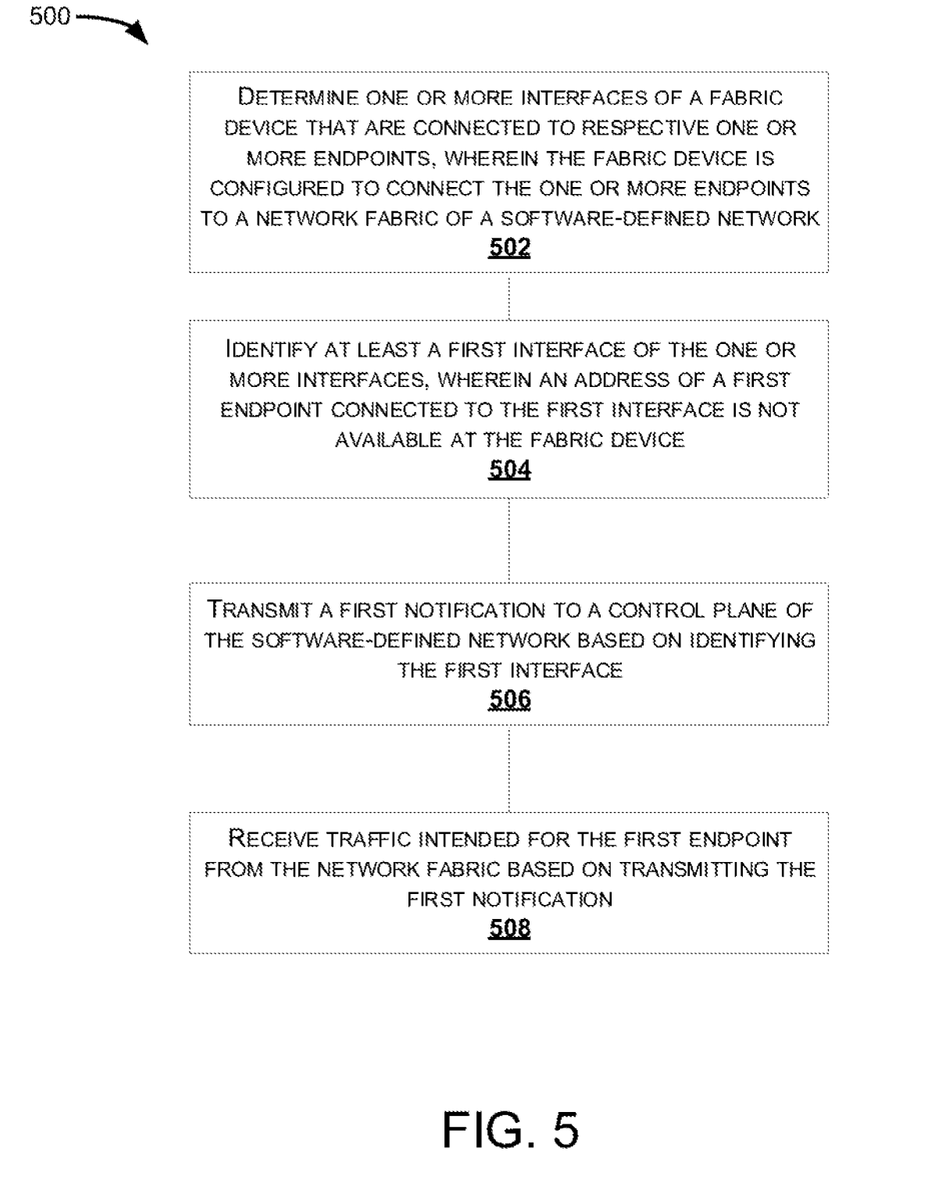
FIG. 5 illustrates a process of identifying and directing traffic to silent hosts, in accordance with some examples.

Having described example systems and concepts, the disclosure now turns to the process 500 illustrated in FIG. 5. The blocks outlined herein are examples and can be implemented in any combination thereof, including combinations that exclude, add, or modify certain steps.

At the block 502, the process 500 includes determining one or more interfaces of a fabric device that are connected to respective one or more endpoints, wherein the fabric device is configured to connect the one or more endpoints to a network fabric of a software-defined network. For example, the routers 326A-B can execute IPDT or other device tracking mechanisms to determine the endpoints connected to them, as discussed with reference to FIGS. 3-4.

At the block 504, the process 500 includes identifying at least a first interface of the one or more interfaces, wherein an address of a first endpoint connected to the first interface is not available at the fabric device. For example, the routers 326A-B can identify addresses of the one or more endpoints connected to the one or more interfaces using device tracking mechanisms and detect the endpoints such as those which include the silent hosts 330A-B whose MAC addresses are not available. In examples where the silent host 330B may be indirectly connected, the router 326B, for example, can receive an indication of a second endpoint comprising the silent host from a network device (e.g., the network device 328B), the network device connecting the second endpoint to the router 326B.

At the block 506, the process 500 includes, transmitting a first notification to a control plane of the software-defined network based on identifying the first interface. For example, the routers 326A-B may transmit registrations indicating the possible silent hosts behind them to the control plane 130, based on which the control plane 130 may create a flood list 402 which includes the routers 326A-B. In other examples, the routers 326A-B may subscribe to multicast groups based on the notifications, based on which the control plane 130 may provide the multicast group information to requesting routers 322B regarding the routers 326A-B potentially having silent hosts behind them.

At the block 508, the process 500 includes receiving traffic intended for the first endpoint from the network fabric based on transmitting the first notification. For example, the packets may be multicast from the router 322B using the flood list 402 created using the notifications and received by the routers 326A-B, or the packets may be received based on the routers 326A-B having subscribed to multicast groups as explained above.

In some examples, the first endpoint is connected to the first interface through a local network. For example, the silent hosts 330A-B may be connected to respective routers 326A-B through a layer 2 or LAN network as discussed above.

Figure 6:
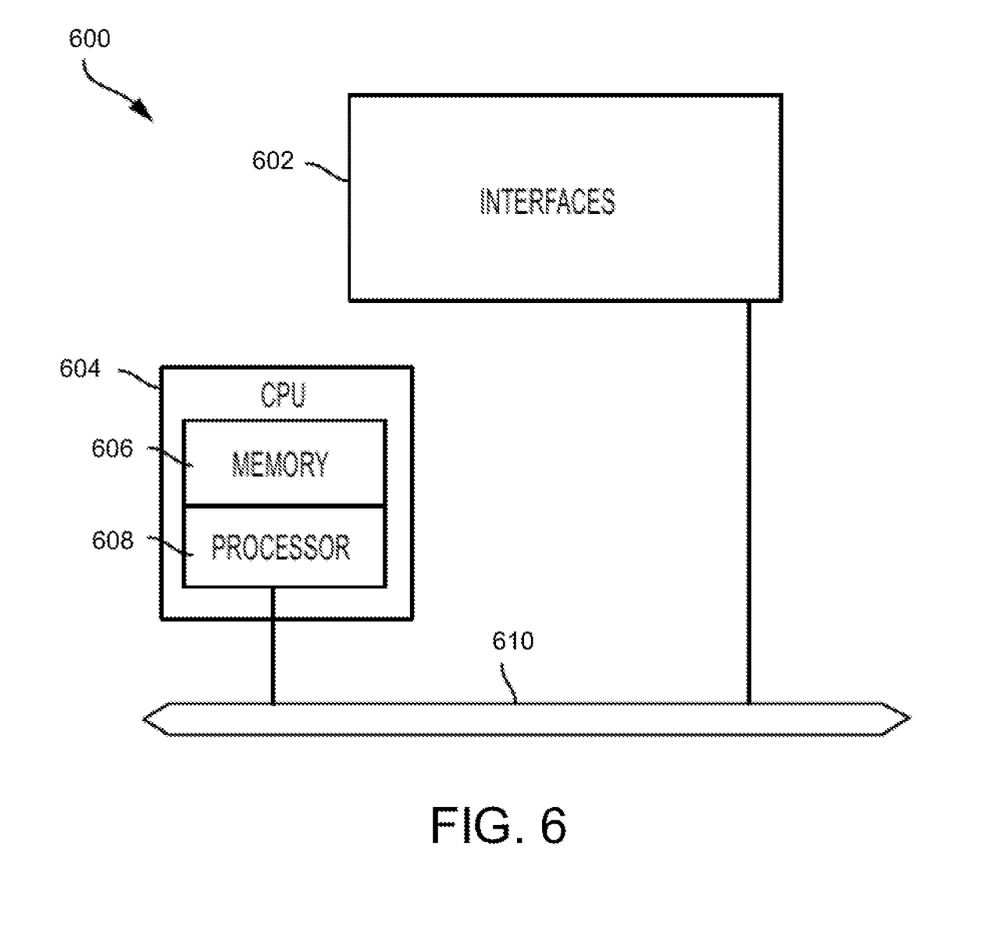
FIG. 6 illustrates an example network device in accordance with some examples.

FIG. 6 illustrates an example network device 600 suitable for implementing the aspects according to this disclosure. In some examples, the edge/border devices or other devices, hosts, silent hosts, network devices, etc., discussed above may be implemented according to the configuration of the network device 600. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, processor 608 can be specially designed hardware for controlling the operations of the network device 600. In some cases, a memory 606 (e.g., non-volatile RAM, ROM, etc.) also forms part of the CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

Figure 7:
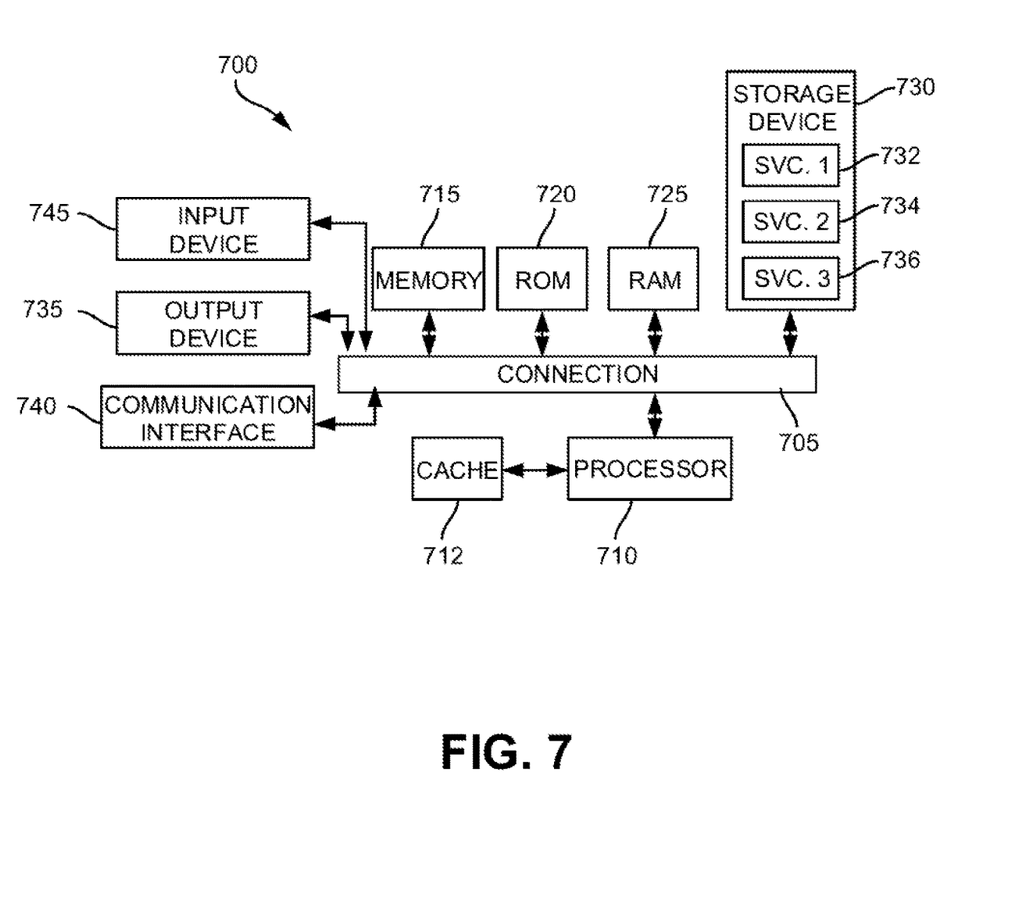
FIG. 7 illustrates an example computing device architecture, in accordance with some examples.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   identifying an interface of a fabric device that connects endpoints to a network fabric of a software-defined network;
   determining that an address of an endpoint connected to the interface is unavailable at the fabric device;
   transmitting a notification to a control plane of the software-defined network that the endpoint is a silent host based on a determination that the address of the endpoint is unavailable at the fabric device; and
   routing traffic, that is intended for the endpoint through the network fabric, from the endpoint to the fabric device in response to the notification.

2. The method of claim 1, wherein the address of the endpoint is unavailable at the fabric device based on a lack of traffic flow from the silent host.

3. The method of claim 1, further comprising determining that the address of the endpoint connected to the interface is unavailable at the fabric device based on interface-based device tracking performed at the fabric device.

4. The method of claim 1, further comprising:
adding the fabric device to a flood list in response to the notification, the flood list including a plurality of fabric devices; and
routing the traffic to the plurality of fabric devices including the fabric device based on the flood list as part of routing the traffic from the endpoint to the fabric device in response to the notification.

5. The method of claim 4, wherein at least a subset of the plurality of devices is added to the flood list based on connection of the subset of the plurality of devices to endpoints with unavailable addresses.

6. The method of claim 1, further comprising receiving the traffic at the fabric device after it is routed from the endpoint to the fabric device in response to the notification.

7. The method of claim 1, further comprising:
determining that another endpoint connected to the fabric device relies on broadcast flooding;
transmitting another notification to the control plane of the software-defined network based on a determination that the another endpoint relies on broadcast flooding; and
routing traffic, that is intended for the another endpoint through the network fabric, from the another endpoint to the fabric device in response to the another notification.

8. The method of claim 7, further comprising determining that the another endpoint connected to the fabric device relies on the broadcast flooding based on a type of traffic that the fabric device sends.

9. A system comprising:
one or more processors; and
a computer-readable medium comprising instructions stored therein, which when executed by the one or more processors, cause the one or more processors to:
identify an interface of a fabric device that connects endpoints to a network fabric of a software-defined network;
determine that an address of an endpoint connected to the interface is unavailable at the fabric device;
transmit a notification to a control plane of the software-defined network that the endpoint is a silent host based on a determination that the address of the endpoint is unavailable at the fabric device; and
route traffic, that is intended for the endpoint through the network fabric, from the endpoint to the fabric device in response to the notification.

10. The system of claim 9, wherein the instructions, which when executed by the one or more processors, further cause the one or more processors to receive the traffic at the fabric device after it is routed from the endpoint to the fabric device in response to the notification.

11. The system of claim 9, wherein the address of the endpoint is unavailable at the fabric device based on a lack of traffic flow from the silent host.

12. The system of claim 9, wherein the instructions, which when executed by the one or more processors, further cause the one or more processors to determine that the address of the endpoint connected to the interface is unavailable at the fabric device based on interface-based device tracking performed at the fabric device.

13. The system of claim 9, wherein the instructions, which when executed by the one or more processors, further cause the one or more processors to:
add the fabric device to a flood list in response to the notification, the flood list including a plurality of fabric devices; and
route the traffic to the plurality of fabric devices including the fabric device based on the flood list as part of routing the traffic from the endpoint to the fabric device in response to the notification.

14. The system of claim 13, wherein at least a subset of the plurality of devices is added to the flood list based on connection of the subset of the plurality of devices to endpoints with unavailable addresses.

15. The system of claim 9, wherein the instructions, which when executed by the one or more processors, further cause the one or more processors to:
determine that another endpoint connected to the fabric device relies on broadcast flooding;
transmit another notification to the control plane of the software-defined network based on a determination that the another endpoint relies on broadcast flooding; and
route traffic, that is intended for the another endpoint through the network fabric, from the another endpoint to the fabric device in response to the another notification.

16. The system of claim 15, wherein the instructions, which when executed by the one or more processors, further cause the one or more processors to determine that the another endpoint connected to the fabric device relies on the broadcast flooding based on a type of traffic that the fabric device sends.

17. A non-transitory computer-readable storage medium comprising instructions stored therein, which when executed by one or more processors, cause the one or more processors to:
identify an interface of a fabric device that connects endpoints to a network fabric of a software-defined network;
determine that an address of an endpoint connected to the interface is unavailable at the fabric device;
transmit a notification to a control plane of the software-defined network that the endpoint is a silent host based on a determination that the address of the endpoint is unavailable at the fabric device; and
route traffic, that is intended for the endpoint through the network fabric, from the endpoint to the fabric device in response to the notification.

18. The non-transitory computer-readable storage medium of claim 17, wherein the instructions, which when executed by the one or more processors, further cause the one or more processors to:
determine that another endpoint connected to the fabric device relies on broadcast flooding;
transmit another notification to the control plane of the software-defined network based on a determination that the another endpoint relies on broadcast flooding; and
route traffic, that is intended for the another endpoint through the network fabric, from the another endpoint to the fabric device in response to the another notification.

* * * * *